(12) United States Patent
Ouchi (10) Patent No.: US 8,928,771 B2
(45) Date of Patent: Jan. 6, 2015

(54) IMAGE PROCESSING APPARATUS AND IMAGE PROCESSING METHOD

(75) Inventor: Kenji Ouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 13/596,797

(22) Filed: Aug. 28, 2012

(65) Prior Publication Data

US 2013/0057727 A1 Mar. 7, 2013

(30) Foreign Application Priority Data

Sep. 7, 2011 (JP) .................................. 2011-195402

(51) Int. Cl.
*H04N 5/228* (2006.01)
*H04N 9/73* (2006.01)

(52) U.S. Cl.
CPC .................................... *H04N 9/735* (2013.01)
USPC ..................................... 348/222.1; 348/223.1

(58) Field of Classification Search
CPC ..................................................... H04N 9/735
USPC ................. 348/222.1, 223.1, 224.1, 241, 371
See application file for complete search history.

(56) References Cited

U.S. PATENT DOCUMENTS

| | | | |
|---|---|---|---|
| 2003/0011686 A1 | 1/2003 | Higuchi | |
| 2003/0090750 A1* | 5/2003 | Takahashi | 358/516 |
| 2004/0233298 A1* | 11/2004 | Aotsuka | 348/223.1 |
| 2005/0219587 A1* | 10/2005 | Hayaishi | 358/1.9 |
| 2006/0284991 A1 | 12/2006 | Ikeda | |
| 2007/0268379 A1 | 11/2007 | Suzuki et al. | |
| 2008/0211925 A1 | 9/2008 | Misawa et al. | |
| 2011/0205392 A1* | 8/2011 | Yokoi | 348/224.1 |
| 2012/0008009 A1 | 1/2012 | Ito et al. | |
| 2012/0057045 A1 | 3/2012 | Shimizu | |

FOREIGN PATENT DOCUMENTS

| | | |
|---|---|---|
| JP | 2000-212641 A | 8/2000 |
| JP | 3540485 B2 | 7/2004 |

OTHER PUBLICATIONS

U.S. Appl. No. 13/596,793, filed Aug. 28, 2012, Yusuke Shimizu.
U.S. Appl. No. 13/596,803, filed Aug. 28, 2012, Masahiro Takayama.

* cited by examiner

*Primary Examiner* — Trung Diep
(74) *Attorney, Agent, or Firm* — Canon USA Inc IP Division (57) ABSTRACT

An image processing apparatus generates first image data based on a first white balance correction value corresponding to a first light source, and second image data based on second white balance correction value corresponding to a second light source, selects one white evaluation region for determining a combination ratio from a plurality of white evaluation regions, compares a color evaluation value of the image data with the selected white evaluation region under the second light source, determines a combination ratio of the first image data and the second image data based on a result of the comparison, and combines the first image data and the second image data according to the determined combination ratio.

12 Claims, 6 Drawing Sheets

IMAGE PROCESSING APPARATUS AND IMAGE PROCESSING METHOD

BACKGROUND OF THE INVENTION

1. Field of the Invention

The present invention relates to a white balance control technology for image data.

2. Description of the Related Art

There has conventionally been known a method for adjusting white balance (WB) based on a signal output from an image sensor. As an example, automatic white balance (AWB) processing is known. The automatic white balance control is for automatically detecting a portion likely to be white from a captured image data, calculating a white balance coefficient from an average value among color components of the entire screen, and then applying the calculated white balance coefficient to the entire screen.

Such automatic white balance processing has the following problems. In a scene where a plurality of different light sources is present, the calculated white balance coefficient is applied to the entire screen. It is, therefore, difficult to carry out white balance control for achieving appropriate colors for the respective light sources. For example, it may be supposed that while a main object is illuminated by a mercury lamp in a nightscape scene, a light source for a group of buildings in the background is a fluorescent lamp. In such a scene, when the white balance of the main object under the mercury lamp light source is set appropriate, a florescent lamp light source portion of the background becomes reddish. Similarly, when the white balance of the background is set appropriate, the white balance of the mercury lamp light source portion of the main object shifts from an appropriate state. Further, when white balance control is carried out to set intermediate white balance appropriately between the light sources, both light source portions are colored.

Further, in many cases, a color evaluation value of each block under the mercury lamp light source cannot be detected within a white detection range under a normal light source. Even in a single light source scene of the mercury lamp, it is difficult to acquire appropriate white balance.

Japanese Patent Application Laid-Open No. 2000-212641 discusses the following technology. That is, according to the technology discussed in Japanese Patent Application Laid-Open No. 2000-212641, when the number of blocks determined to be white within a first white detection range is smaller than a fixed number, whether photographing is under a low color temperature light source is determined. When it is determined that the photographing is under the low color temperature light source, a white detection range of the low color temperature side is widened to be set as a second white detection range. Then, when the number of blocks determined to be white within the second white detection range is equal to or larger than the fixed number, a white balance correction coefficient is calculated based on the blocks determined to be white.

However, according to the technology discussed in Japanese Patent Application Laid-Open No. 2000-212641, when it is determined that the photographing is under the low color temperature light source, the white detection range is widened, and the white balance correction coefficient is calculated based on the new blocks determined to be white. Thus, the technology cannot deal with a case where a plurality of light sources is present.

SUMMARY OF THE INVENTION

The present invention is directed to an image processing apparatus and an image processing method for generating image data of an appropriate color even when a plurality of light sources are mixed.

According to an aspect of the present invention, an image processing apparatus includes a correction value determination unit configured to determine a first white balance correction value corresponding to a first light source in captured image data and a second white balance correction value corresponding to a second light source in the image data, a generation unit configured to generate first image data by correcting the image data based on the first white balance correction value, and second image data by correcting the image data based on the second white balance correction value, a color evaluation value calculation unit configured to calculate a color evaluation value of the image data, a selection unit configured to select one white evaluation region for determining a combination ratio from a plurality of white evaluation regions, a combination ratio determination unit configured to compare the color evaluation value of the image data with the white evaluation region under the second light source selected by the selection unit, and to determine a combination ratio of the first image data and the second image data based on a result of the comparison, and a combining unit configured to combine the first image data and the second image data according to the combination ratio determined by the combination ratio determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
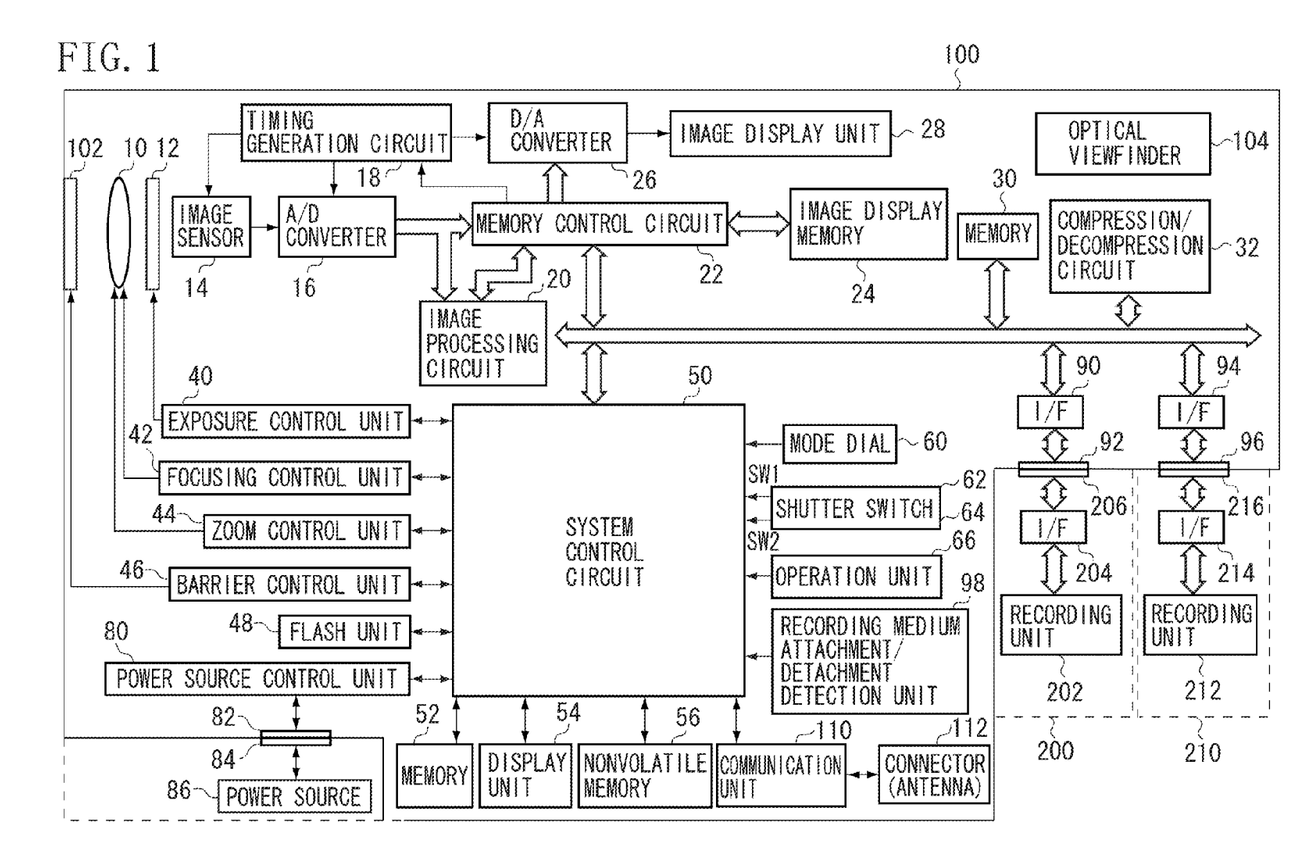
FIG. 1 is a block diagram illustrating a configuration example of an image processing apparatus according to an exemplary embodiment of the present invention.

FIG. 1 is a block diagram illustrating a configuration example of an image processing apparatus according to an exemplary embodiment of the present invention. In FIG. 1, the image processing apparatus 100 includes a photographic lens 10, a shutter 12 having a diaphragm function, an image sensor 14 that converts an optical image into an electric signal, an analog/digital (A/D) converter 16 that converts an analog signal output from the image sensor 14 into a digital signal, and a timing generation circuit 18 that supplies a clock signal or a control signal to the image sensor 14, the A/D converter 16, and a digital/analog (D/A) converter 26 and that is controlled by a memory control circuit 22 and a system control circuit 50.

An image processing circuit 20 executes predetermined pixel interpolation processing or color conversion processing for data from the A/D converter 16 or data from the memory control circuit 22. The image processing circuit 20 carries out autofocus (AF) processing of a through-the-lens (TTL) method, automatic exposure (AE) processing, and flash pre-emission (EF) processing where predetermined calculation processing is executed by using captured image data, and the system control circuit 50 executes control for an exposure control unit 40 and a focusing control unit 42 based on the acquired calculation result. Further, the image processing circuit 20 carries out predetermined calculation processing by using the captured image data, and automatic white balance processing of a TTL method based on the acquired calculation result.

The memory control circuit 22 controls the A/D converter 16, the timing generation circuit 18, the image processing circuit 20, an image display memory 24, the D/A converter 26, a memory 30, and a compression/decompression circuit 32. Data of the A/D converter 16 is written in the image display memory 24 or the memory 30 via the image processing circuit 20 or the memory control circuit 22, or directly by the memory control circuit 22.

Image data for displaying, which has been written in the image display unit 24, is passed through the D/A converter 26 to be displayed by an image display unit 28 including a thin-film transistor liquid crystal display (TFT LCD). Sequentially displaying the captured image data by using the image display unit 28 can realize an electronic viewfinder function. The image display unit 28 can arbitrarily turn ON/OFF displaying according to an instruction from the system control circuit 50. When the displaying is turned OFF, power consumption of the image processing apparatus 100 can be greatly reduced.

The memory 30, which stores captured still image data or moving image data, has a storage capacity sufficient for storing a predetermined number of pieces of still image data or moving image data of a predetermine period of time. Accordingly, even in the case of continuous photographing for continuously capturing a plurality of still image data or a panoramic photographing, a great volume of images can be written in the memory 30 at a high speed. Further, the memory 30 can be used as a work area for the system control circuit 50.

The compression/decompression circuit 32, which compresses/decompresses the image data by adaptive discrete cosine conversion (ADCT), reads the image stored in the memory 30 to compress or decompress it, and writes the processed data in the memory 30.

The exposure control unit 40, which controls the shutter 12 having the diaphragm function, has a flash light adjustment function by association with a flash unit 48. The focusing control unit 42 controls focusing of the photographic lens 10. A zoom control unit 44 controls zooming of the photographic lens 10. A barrier control unit 46 controls an operation of a projection unit 102.

The flash unit 48 has an AF auxiliary light projection function and a flash light adjustment function. The number of flash units can be one, or a plurality of flash units such as a xenon (Xe) tube for flash light emission and a light emitting diode (LED) for light emission of very short periods of time can be prepared. The exposure control unit 40 and the focusing control unit 42 are controlled by using the TTL method. The system control circuit 50 controls the exposure control unit 40 and the focusing control unit 42 based on the result of calculating the captured image data by the image processing circuit 20.

The system control circuit 50 controls the entire image processing apparatus 100. A memory 52 stores a constant, a variable, and a program for operating the system control circuit 50. The memory 52 further stores a program diagram used for the AE. The program diagram is a table defining a relationship between an exposure value and a control value of an aperture value and a shutter speed.

A display unit 54 of a liquid crystal display apparatus 28 displays an operation state or a message by using a character, an image, or a voice in response to execution of the program at the system control circuit 50. A single or a plurality of display units 54 is disposed in an easily viewed place near an operation unit of the image processing apparatus 100, and configured by combining, for example, an LCD, an LED, and a sound generation element.

Certain functions of the display unit 54 are installed in an optical viewfinder 104. Among display contents of the display unit 54, those to be displayed on the LCD include: a single-shot/continuous-shot display, a self-timer display, a compression rate display, a recording pixel number display, a recording frame number display, a remaining photographable number display, a shutter speed display, an aperture value display, an exposure compensation display, a flash display, a red-eye reduction display, a macro-shot display, a buzzer setting display, a clock battery remaining amount display, a battery remaining amount display, an error display, an information display based on a plurality of digits of numerals, an attached/detached state display of recording media 200 and 210, a communication interface (I/F) operation display, and a date/time display.

Among the display contents of the display unit 54, those to be displayed in the optical viewfinder 104 include: an in-focus display, a camera-shake warning display, a flash charge display, a shutter speed display, an aperture value display, and an exposure compensation display.

For an electrically erasable/recordable nonvolatile memory 56, for example, an electrically erasable programmable read-only memory (EEPROM) is used. Operation units 60, 62, 64, and 66 for inputting various operation instructions are configured each by a switch, a dial, a touch panel, a pointing device based on visual line detection or a voice recognition device, or combining a plurality of units.

The operation units will specifically be described. The mode dial switch 60 can switch and set function modes including a power-off mode, an automatic photographing mode, a photographing mode, a panoramic photographing mode, a reproduction mode, a multiscreen reproduction/erasure mode, a personal computer (PC) connection mode. The shutter switch 62 (SW1) is turned ON during an operation of a shutter button (not illustrated) to instruct an operation start of AF processing, AE processing, AWB processing, or EF processing.

The shutter switch 64 (SW2) is turned ON when the operation of the shutter button (not illustrated) is completed to instruct an operation start of a series of processes, namely, exposure processing for writing image data of a signal read from the image sensor 14 in the memory 30 via the A/C converter 16 and the memory control circuit 22, development processing using calculation at the image processing circuit 20 or the memory control circuit 22, and recording processing for reading the image data from the memory 30, compressing the image data by the compression/decompression circuit 32, and writing the image data in the recording medium 200 or 210.

The operation unit 66 includes various buttons and a touch panel: specifically, a menu button, a set button, a macrobutton, an image display ON/OFF button, a multiscreen reproduction page break button, a flash setting button, a single-shoot/continuous-shoot/self-timer switching button, a menu movement + (plus) button, a menu movement − (minus) button, a reproduced image movement + (plus) button, a reproduced image movement − (minus) button, a captured image quality selection button, an exposure compensation button, and a date/time setting button.

A power source control unit 80 includes a battery detection circuit, a direct current (DC)-DC converter, and a switch circuit for switching a block to be energized. The power source control unit 80 detects presence of a loaded battery, a type of the battery, or a remaining battery amount, controls the DC-DC converter based on the detection result and an instruction from the system control circuit 50, and supplies a necessary voltage to portions including a recording medium for a necessary period.

The image processing apparatus 100 further includes connectors 82 and 84, a power source unit 86 including a primary battery such as an alkaline battery or a lithium battery, a secondary battery such as a NiCd battery, a NiMH battery, or a Li battery, and an alternative current (AC) adaptor, interfaces 90 and 94 with a recording medium such as a memory card or a hard disk, connectors 92 and 96 for connection with the recording medium such as a memory card or a hard disk, and a recording medium attachment/detachment detection unit that detects loading of the recording medium 200 or 210 in the connector 92 or 96.

In the exemplary embodiment, the image processing apparatus 100 includes the two interfaces and the two connectors. However, the numbers of interfaces and connectors for attaching the recording medium can be singular or plural. For the interface and the connector, those compliant with a standard of a Personal Computer memory Card International Association PCMCIA) card or a CompactFlash (CF, registered trademark) card can be used.

When for the interfaces 90 and 94 and the connectors 92 and 96, those compliant with the standard of the PCMCIA card or the CF card can be used, by connecting various communication cards such as a local area network (LAN) card or a modem card, a universal serial bus (USB) card, an Institute of Electrical and Electronics Engineers (IEEE) 1394 card, a P1284 card, a small computer system interface (SCSI) card, and a personal handyphone system communication card, image data and management information accessory to the image data can be transferred with other computers or peripheral devices such as a printer. The protection unit 102 is a barrier for covering an imaging unit including the lens 10 of the image processing apparatus 100 to prevent staining or damaging of the imaging unit.

Photographing can be carried out by using only the optical viewfinder 104 without using the electronic viewfinder function of the image display unit 28. In the optical viewfinder 104, some functions of the display unit 54, such as the in-focus display, the hand-shake warning display, the flash charge display, the shutter speed display, the aperture value display, and the exposure compensation display, are installed.

A communication unit 110 has various communication functions such as RS232C or USB, IEEE1394, P1284, SCSI, a modem, a LAN, and wireless communication. A connector 112, or an antenna in the case of wireless communication, connects the image processing apparatus 100 to other devices by the communication unit 110. The recording medium 200 is a memory card or a hard disk. The recording medium 200 includes a recording unit 202 including a semiconductor memory or a magnetic disk, an interface 204 with the image processing apparatus 100, and a connector 206 for connection with the image processing apparatus 100. The recording medium 210 is a memory card or a hard disk. The recording medium 210 includes a recording unit 212 including a semiconductor memory or a magnetic disk, an interface 214 with the image processing apparatus 100, and a connector 216 for connection with the image processing apparatus 100.

Next, a method for calculating a WB correction value by the image processing circuit 20 according to the exemplary embodiment will be described. This processing is for calculating a WB correction value based on WB control using a blackbody locus. First, referring to FIG. 2, a method for calculating a first white balance correction value (first WB correction value) will be described. The first WB correction value is calculated by normal white balance control for a first light source.

Figure 2:
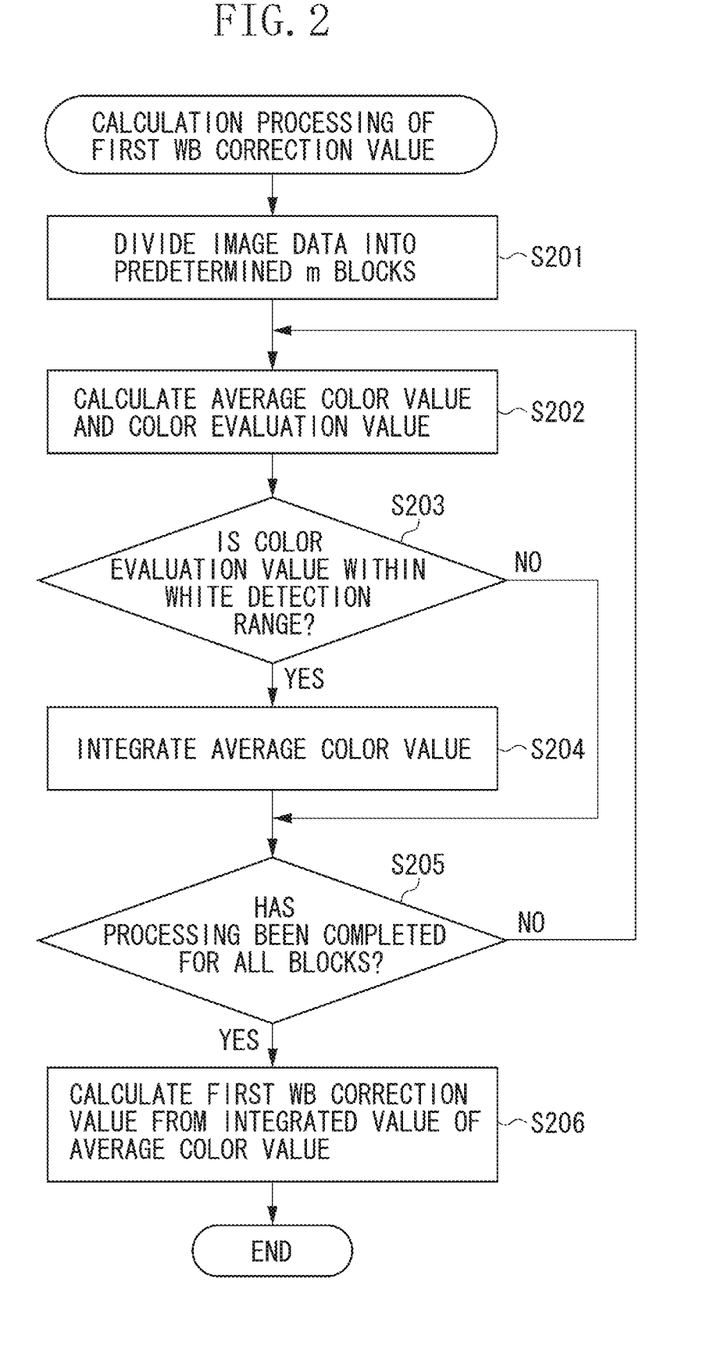
FIG. 2 is a flowchart illustrating a method for calculating a first white balance correction value (first WB correction value).

In step S201, the image processing circuit 20 reads the image data stored in the memory 30, and divides the image data into predetermined m blocks. In step S202, the image processing circuit 20 adds and averages pixel values for respective colors for blocks (1 to m) to calculate average color values (R[i], G[i], B[i]), and calculates a color evaluation value (Cx[i], Cy[i]) by using the following expressions:

$$Cx[i]=(R[i]-B[i])/Y[i]\times 1024$$

$$Cy[i]=(R[i]+B[i]-2G[i])/Y[i]\times 1024$$

where Y[i]=(R[i]+2G[i]+B[i])/4.

Figure 3:
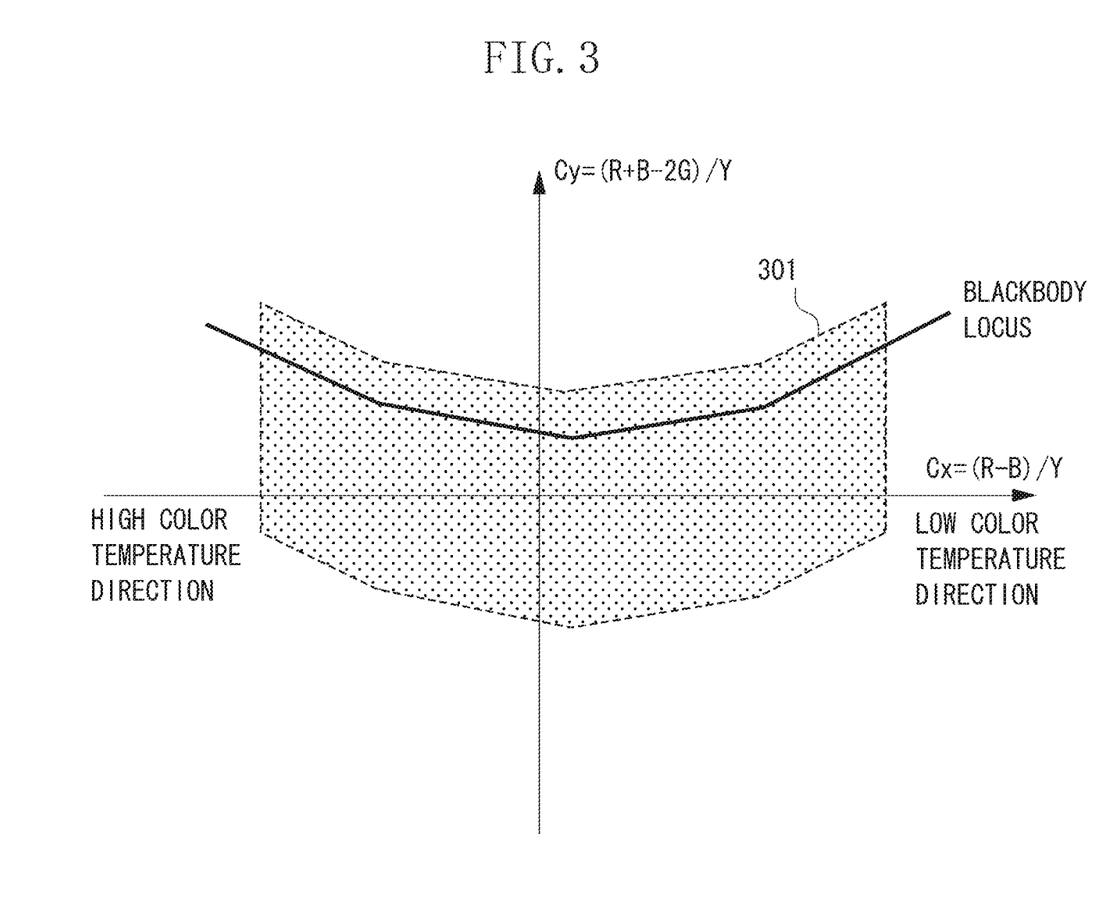
FIG. 3 is a graph used for white detection.

In step S203, the image processing circuit 20 determines whether the color evaluation value (Cx[i], Cy[i]) of an i-th block is within a preset white detection range 301 illustrated in FIG. 3. The white detection range 301 is set by first photographing a white object under different light sources and then plotting calculated color evaluation values. The white detection range can be set individually according to a photographing mode. In FIG. 3, a negative direction of the x coordinate (Cx) represents a color evaluation value when white object is photographed with a high color temperature light source, while a positive direction thereof represents a color evaluation value when white object is photographed with a low color temperature light source. The y coordinate (Cy) indicates a degree of a green component in a light source, and the green component is larger toward a negative direction of the y coordinate.

When the color evaluation value (Cx[i], Cy[i]) of the i-th block is within the preset white detection range 301 (YES in step S203), the processing proceeds to step S204. On the other hand, when the color evaluation value (Cx[i], Cy[i]) of the i-th block is not within the preset white detection range 301 (NO in step S203), the processing skips step S204 to proceed to step S205.

In step S204, the image processing circuit 20 determines that the i-th block is white to integrate the average color values (R[i], G[i], B[i]) of the block. The processing of steps S203 and S204 can be represented by the following expressions:

$$SumR = \sum_{i=0}^{m} Sw[i] \times R[i]$$

-continued $$SumG = \sum_{i=0}^{m} Sw[i] \times G[i]$$

$$SumB = \sum_{i=0}^{m} Sw[i] \times B[i]$$

In the expressions, when the color evaluation value (Cx[i], Cy[i]) is within the white detection range 301, Sw[i] is set to 1. When the color evaluation value (Cx[i], Cy[i]) is not within the white detection range 301, Sw[i] is set to 0. Accordingly, in steps S203 and S204, whether to integrate the average color values (R[i], G[i], and B[i]) is substantially determined.

In step S205, the image processing circuit 20 determines whether the processing has been completed for all the blocks. When not completed (NO in step S205), the processing returns to step S202 to be repeated. On the other hand, when completed (YES in step S205), the processing proceeds to step S206.

In step S206, the image processing circuit 20 calculates a first WB correction value (WBCo1_R1, WBCo1_G1, WBCo1_B1) from integrated values (SumR1, SumG1, SumB1) of the acquired average color values by using the following expressions:

WBCo1_R1=SumY1×1024/SumR1

WBCo1_G1=SumY1×1024/SumG1

WBCo1_B1=SumY1×1024/SumB1 where Sum_Y1=(SumR1+2×SumG1+SumB1)/4.

Next, a method for determining a second white balance correction value (second WB correction value) for a second light source will be described. The second WB correction value (WBCo2_R, WBCo2_G, WBCo2_B) is determined by using predetermined values for the respective identified light sources. For these values, values calculated beforehand by photographing white objects under the respective light sources are used. For example, in a scene where a mercury lamp is used for the light source, a WB correction value determined beforehand for the mercury lamp is used as the second WB correction value. In this case, when a plurality of types of light sources are present, the second WB correction value can be varied from one type to another. For example, when two types of mercury lamps are present, the WB correction value can be varied between the mercury lamps.

Figure 4:
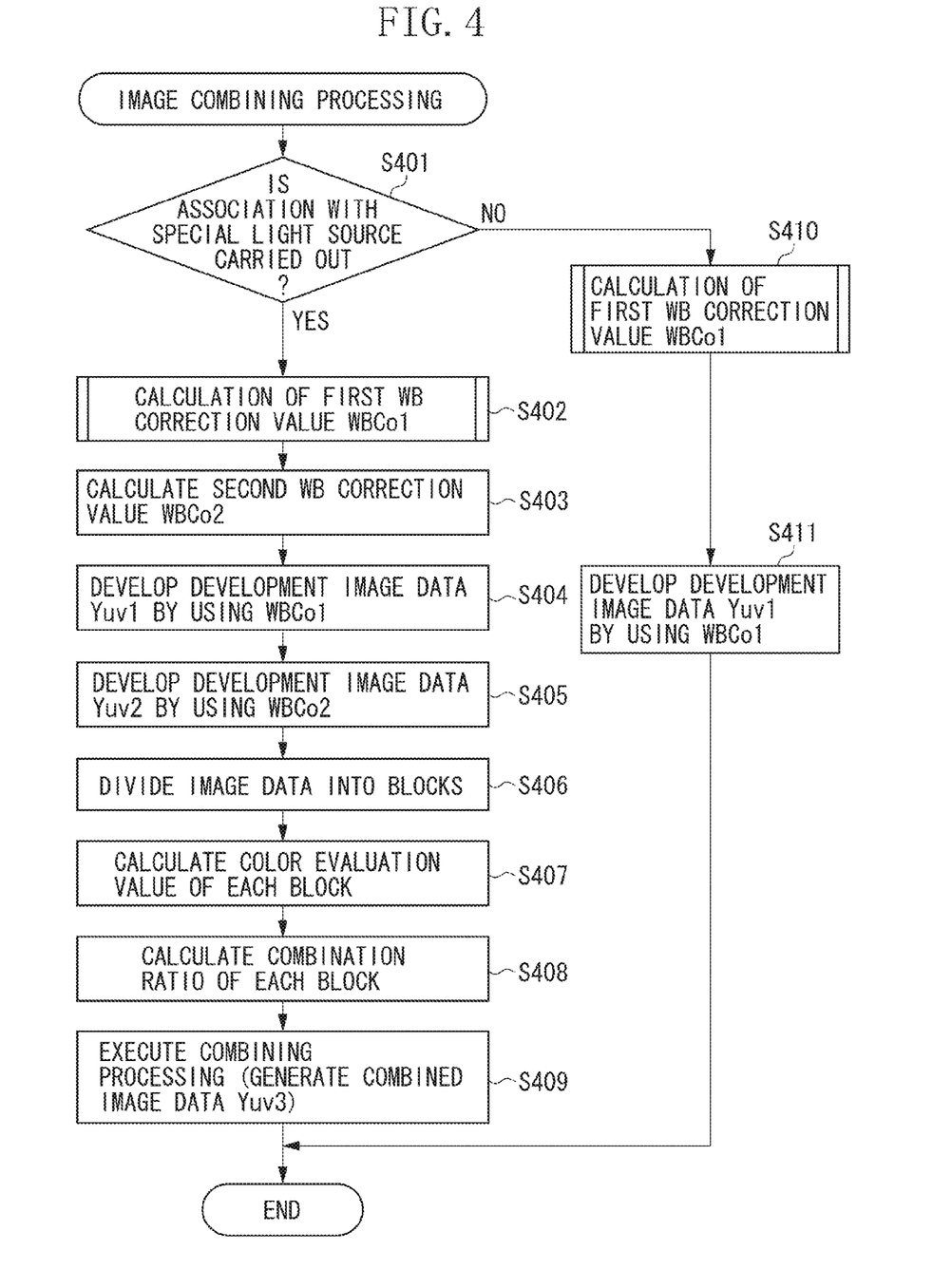
FIG. 4 is a flowchart illustrating combining processing of image data by an image processing circuit.

Next, referring to a flowchart of FIG. 4, combining processing of the imaged data of the image processing circuit 20 will be described. In step S401, the image processing circuit 20 determines whether to execute association with the special light source. In this case, the image processing circuit 20 can estimate a light source based on the image data stored in the memory 30, and determine whether to execute association with the special light source according to the estimation result, or determine whether to execute association with the special light source according to a result designated beforehand by the user. When association with the special light source is executed (YES in step S401), the processing proceeds to step S402. On the other hand, when association with the special light source is not executed (NO in step S401), the processing proceeds to step S410.

In step S402, the image processing circuit 20 calculates a first WB correction value WBCo1 by the method described above referring to FIG. 2. In step S403, the image processing circuit 20 calculates a second WB correction value WBCo2 by the method. In step S404, the image processing circuit 20 develops development image data Yuv1 from the image data stored in the memory 30 by using the first WB correction value WBCo1. In step S405, the image processing circuit 20 develops development image data Yuv2 from the image data stored in the memory 30 by using the second WB correction value WBCo2. The development image data Yuv1 is an example of first image data, and the development image data Yuv2 is an example of second image data.

In step S410, the image processing circuit 20 calculates a first WB correction value WBCo1 by the same method as that in step S402. In step S411, the image processing circuit 20 develops development image data Yuv1 from the image data stored in the memory 30. In other words, the image processing circuit 20 executes normal white balance control.

In step S406, the image processing circuit 20 divides each of the image data stored in the memory 30, the development image data Yu1, and the development image data Yu2 into n blocks.

In step S407, the image processing circuit 20 adds and averages pixel values for the respective colors for each block of the image data stored in the memory 30 to calculate average color values (R[i], G[i], B[i]). Then, as in the case of step S202, the image processing circuit 20 calculates a color evaluation value (Cx[i], Cy[i]). The color evaluation value (Cx[i], Cy[i]) calculated in step S202 can directly be used. In this case, when a saturated pixel is present, a pixel value of the saturated pixel and a pixel value of a pixel of another color corresponding to the saturated pixel do not need to be included in addition processing. For example, when a certain R pixel is a saturated pixel, a pixel value of the R pixel, and a pixel value of a G pixel and a pixel value of a B pixel corresponding to the R pixel are not included in the addition processing.

Figure 5:
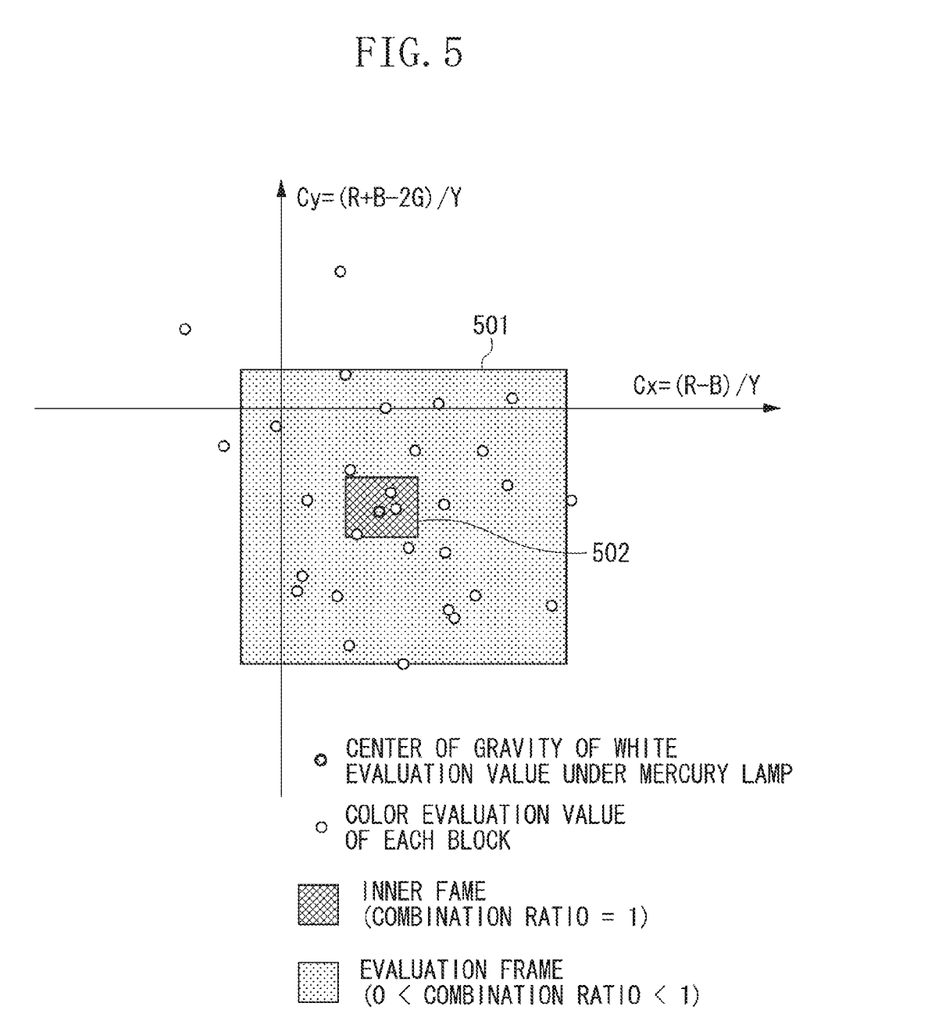
FIG. 5 illustrates a relationship between color evaluation values used for combination ratio calculation.

In step S408, the image processing circuit 20 sets an evaluation frame and an inner frame described below according to each light source, and calculates a combination ratio of each block based on a difference between the second WB correction value and the color evaluation value of each block. For example, in a scene using a mercury lamp as a light source, as illustrated in FIG. 5, the image processing circuit 20 sets an evaluation frame 501 and an inner frame 502 for the mercury lamp by using, as a center of gravity, a predetermined white evaluation value under the mercury lamp light source. Then, the image processing circuit 20 calculates a combination ratio of each block based on a distance between the predetermined white evaluation value under the mercury lamp light source and the color evaluation value of each block. The evaluation frame 501 is set based on a color evaluation value calculated beforehand by photographing a white object under the mercury lamp light source.

First, for a block where a difference between the color evaluation value and the white evaluation value under the mercury lamp light source is small and a color evaluation value is present in the inner frame 502 illustrated in FIG. 5, a combination ratio α[i] of the block is set to 1. Then, for a block where a color evaluation value is present in a region between the evaluation frame 501 and the inner frame 502 illustrated in FIG. 5, the image processing circuit 20 calculates a combination ratio α[i] as follows. The image processing circuit 20 linearly reduces a combination ratio from the inner frame 502 to the evaluation frame 501 to set the inner frame 502 to combination ratio α[i]=1 and the evaluation frame 501 to combination ratio α[i]=0, and calculates a combination ratio α[i] of the block. For a block where a color evaluation value is present outside the evaluation frame 501, the image processing circuit 20 sets a combination ratio α[i] to 0.

In this case, pluralities of evaluation frames and inner frames are stored beforehand to be selectable according to an identified condition. For example, referring to FIG. 6, a case where a face is detected under the mercury lamp light source as an identified condition will be described. As indicated by a frame 603, blocks each of which includes a face under the mercury lamp light source tend to be distributed outside the range of the evaluation frame 501 illustrated in FIG. 5. In view of such a new distribution, when a face is detected, the evaluation frame and the inner frame are respectively changed to a new evaluation frame 601 and a new inner frame 602. As conditions for selecting the evaluation frame 601 and the inner frame 602, in addition to the presence of the face, a condition concerning a special light source correction degree (e.g., user selects one of strong, middle, and weak as strength of correction) designated by the user, or credibility of light source estimation (e.g., determined from a ratio of green region included in image signal or coordinates of distribution of green region in the case of mercury lamp) can simultaneously be used.

The evaluation frame and the inner frame can be formed into arbitrary shapes in place of square shapes. Further, for example, even in a scene that uses a low color temperature light source such as a bulb light source, an evaluation frame and an inner frame suited to the light source are set, and a combination ratio can be calculated by processing similar to the combination ratio calculation method in the scene under the mercury lamp light source.

In step S409, the image processing circuit 20 combines the first development image data Yuv1 and the second development image data Yuv2 by using the combination ratio α[i] of each block to generate combined image data Yuv3. To calculate a color evaluation value (Y3[i], u3[i], v3[i]) of the combined image data Yuv3, a color evaluation value (Y1[i], u1[i], v1[i]) of the development image data Yuv1 and a color evaluation value (Y2[i], u2[i], v2[i]) of the development image data Yuv2 are used. In other words, the image processing circuit 20 calculates the color evaluation value (Y3[i], u3[i], v3[i]) of the combined image data Yuv3 by the following expressions:

$$Y3[i]=Y1[i]*(1-\alpha[i])+Y2[i]*\alpha[i]$$

$$u3[i]=u1[i]*(1-\alpha[i])+u2[i]*\alpha[i]$$

$$v3[i]=v1[i]*(1-\alpha[i])+v2[i]*\alpha[i]$$

To reduce color shifting generated on a boundary portion of the blocks, by further executing pixel interpolation processing in step S408, the image processing circuit 20 can calculate a combination ratio α'[j] for each pixel from the combination ratio α[i] of each block. For example, the image processing circuit 20 calculates the combination ratio α'[j] for each pixel from the combination ratio α[i] of each block by using bilinear interpolation as pixel interpolation processing. In step S409, the image processing circuit 20 combines the development image data Yuv1 and the development image data Yuv2 by using the combination ratio α'[j] for each pixel to generate combined image data Yuv3. To calculate a color evaluation value (Y3[j], u3[j], v3[j]) of the combined image data Yuv3, the image processing circuit 20 uses a color evaluation value (Y1[j], u1[j], v1[j]) of the development image data Yuv1 and a color evaluation value (Y2[j], u2[j], v2[j]) of the development image data Yuv2. In other words, the image processing circuit 20 calculates the color evaluation value (Y3[j], u3[j], v3[j]) of the combined image data Yuv3 by the following expressions:

$$Y3[j]=Y1[j]*(1-\alpha'[j])+Y2[j]*\alpha'[j]$$

$$u3[j]=u1[j]*(1-\alpha'[j])+u2[j]*\alpha'[j]$$

$$v3[j]=v1[j]*(1-\alpha'[j])+v2[j]*\alpha'[j]$$

To reduce the amount of calculation at the image processing circuit 20, only the u component and the v component that are color components can be combined. For example, the image processing circuit 20 calculates the color evaluation value (Y3[i], u3[i], v3[i]) of the combined image data Yuv3 by the following expressions:

$$Y3[i]=Y1[i]$$

$$u3[i]=u1[i]*(1-\alpha[i])+u2[i]*\alpha[i]$$

$$v3[i]=v1[i]*(1-\alpha[i])+v2[i]*\alpha[i]$$

In the combining processing of the image data, the Yuv form is used for the development image data. However, for example, when the RGB form is used as an image form, in place of the expressions used in step S409, the following expressions are used. That is, the image processing circuit 20 calculates a color evaluation value (R1[i], G1[i], B1[i]) of development image data RGB1 developed by using the first WB correction value and a color evaluation value (R2[i], G2[i], B2[i]) of development image data RGB2 developed by using the second WB correction value. Then, the image processing circuit 20 calculates a color evaluation value (R3[i], G3[i], B3[i]) of combined image data RGB3 by the following expressions:

$$R3[i]=R1[i]*(1-\alpha[i])+R2[i]*\alpha[i]$$

$$G3[i]=G1[i]*(1-\alpha[i])+G2[i]*\alpha[i]$$

$$B3[i]=B1[i]*(1-\alpha[i])+B2[i]*\alpha[i]$$

In the combining processing of the image data, when two or more types of light sources are present, two or more pieces of development image data can be combined. For example, when flash light is emitted in the scene using the mercury lamp, the image processing circuit 20 determines, in addition to the first WB correction value and the second WB correction value, a third WB correction value as in the case of the method for determining the second WB correction value. Then, the image processing circuit 20 develops three pieces of image data by using the three WB correction values to combine the image data.

Thus, according to the present exemplary embodiment, in the scene where the plurality of different light sources is present, image data for setting both the main object and the background to appropriate colors is generated, and an image suitable for the user can be provided.

Next, another exemplary embodiment of the present invention will be described. A processing procedure up to combining of image data in the above-described exemplary embodiment is similar to that of the foregoing embodiment except for step S408.

Figure 6:
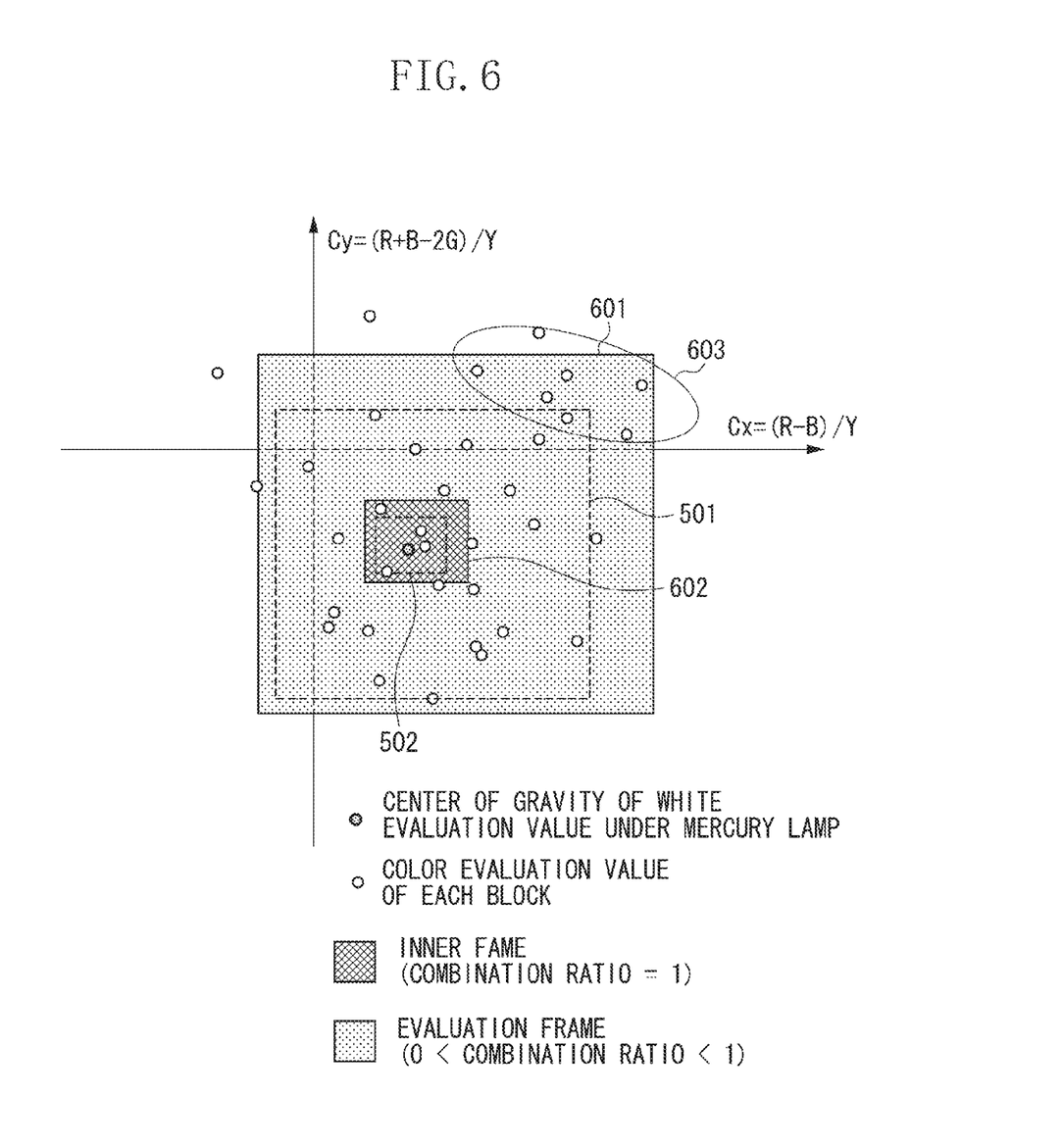
FIG. 6 illustrates a relationship between color evaluation values used for combination ratio calculation when a face is detected.

In an example of a scene using the mercury lamp, in the above-described exemplary embodiment, when a face is detected, the combination ratio is calculated by using not the evaluation frame 501 and the inner frame 502 illustrated in FIG. 5 but the evaluation frame 601 and the inner frame 602 illustrated in FIG. 6. On the other hand, according to the present exemplary embodiment, only when a combination ratio of a block including a face region and a block near the block is calculated, the evaluation frame 601 and the inner frame 602 are used. In other cases, the evaluation frame 501 and the inner frame 502 are used. As a result, WB correction can be carried out more appropriately for a block unrelated to a human object.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-195402 filed Sep. 7, 2011, which is hereby incorporated by reference herein in its entirety.

What is claimed is:

1. An image processing apparatus comprising:
   a correction value determination unit configured to determine a first white balance correction value corresponding to a first light source in captured image data and a second white balance correction value corresponding to a second light source in the image data;
   a generation unit configured to generate first image data by correcting the image data based on the first white balance correction value, and second image data by correcting the image data based on the second white balance correction value;
   a color evaluation value calculation unit configured to calculate a color evaluation value of the image data;
   a selection unit configured to select one color evaluation region for determining a combination ratio from a plurality of color evaluation regions;
   a combination ratio determination unit configured to compare the color evaluation value of the image data with the color evaluation region under the second light source selected by the selection unit, and to determine a combination ratio of the first image data and the second image data based on a result of the comparison; and
   a combining unit configured to combine the first image data and the second image data according to the combination ratio determined by the combination ratio determination unit.

2. The image processing apparatus according to claim 1, further comprising a face detection unit configured to detect a face from the image data,
   wherein the selection unit is configured to select a first color evaluation region when no face is detected by the face detection unit, and a second color evaluation region wider than the first color evaluation region when a face is detected by the face detection unit.

3. The image processing apparatus according to claim 2, wherein the second color evaluation region includes more regions where skin color is present under the second light source than the first color evaluation region.

4. The image processing apparatus according to claim 1, wherein the second light source includes a mercury lamp.

5. The image processing apparatus according to claim 1, wherein the color evaluation value calculation unit is configured to calculate a color evaluation value of the image data for each block; and wherein the combination ratio determination unit is configured to determine the combination ratio for each block based on a difference between the color evaluation value of the image data for each block and the white evaluation value under the second light source.

6. The image processing apparatus according to claim 5, wherein the combination ratio determination unit is configured to determine a combination ratio for each pixel from the combination ratio for each block by pixel interpolation processing.

7. The image processing apparatus according to claim 1, wherein the correction value determination unit is configured to determine the first white balance correction value based on white balance control using a blackbody locus.

8. The image processing apparatus according to claim 1, further comprising:
   an estimation unit configured to estimate a light source for the image data; and
   a determination unit configured to determine whether to execute combining processing by the combining unit according to a result of estimation of the light source by the estimation unit.

9. The image processing apparatus according to claim 1, wherein the color evaluation calculation unit is configured not to use, when calculating the color evaluation value of the image data, a pixel value of a saturated pixel and a pixel value of a pixel of another color corresponding to the saturated pixel for calculation of an average color value.

10. The image processing apparatus according to claim 1, wherein the combining unit is configured to combine only color components of the first image data and the second image data.

11. An image processing method performed by an image processing apparatus, the image processing method comprising:
   determining a first white balance correction value corresponding to a first light source in captured image data and a second white balance correction value corresponding to a second light source in the image data;
   generating first image data by correcting the image data based on the first white balance correction value, and second image data by correcting the image data based on the second white balance correction value;
   calculating a color evaluation value of the image data;
   selecting one color evaluation region for determining a combination ratio from a plurality of color evaluation regions;
   comparing the color evaluation value of the image data with the selected color evaluation region under the second light source, and determining a combination ratio of the first image data and the second image data based on a result of the comparison; and
   combining the first image data and the second image data according to the determined combination ratio.

12. A non-transitory computer-readable storage medium storing a program that causes a computer to execute a method comprising:
   determining a first white balance correction value corresponding to a first light source in captured image data and a second white balance correction value corresponding to a second light source in the image data;
   generating first image data by correcting the image data based on the first white balance correction value, and second image data by correcting the image data based on the second white balance correction value;
   calculating a color evaluation value of the image data;

selecting one color evaluation region for determining a combination ratio from a plurality of color evaluation regions;
comparing the color evaluation value of the image data with the selected color evaluation region under the second light source, and determining a combination ratio of the first image data and the second image data based on a result of the comparison; and
combining the first image data and the second image data according to the determined combination ratio.

* * * * *